March 29, 1949.　　　　R. W. ATWOOD　　　　2,465,567
GARDEN TRACTOR DRIVE TRANSMISSION MECHANISM
Filed Oct. 16, 1945　　　　　　　　　　　　2 Sheets-Sheet 1
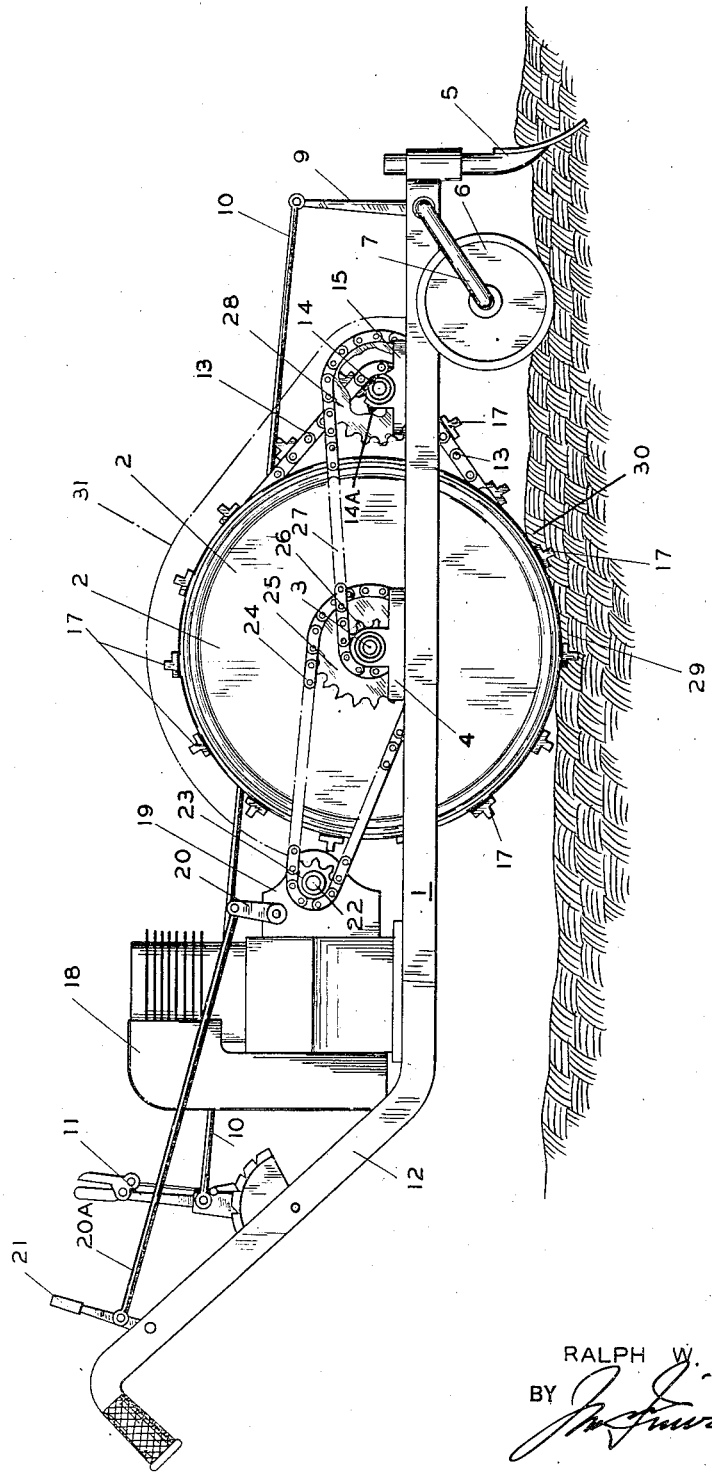
INVENTOR
RALPH W. ATWOOD
BY 
ATTORNEY March 29, 1949.  R. W. ATWOOD  2,465,567
GARDEN TRACTOR DRIVE TRANSMISSION MECHANISM
Filed Oct. 16, 1945  2 Sheets-Sheet 2
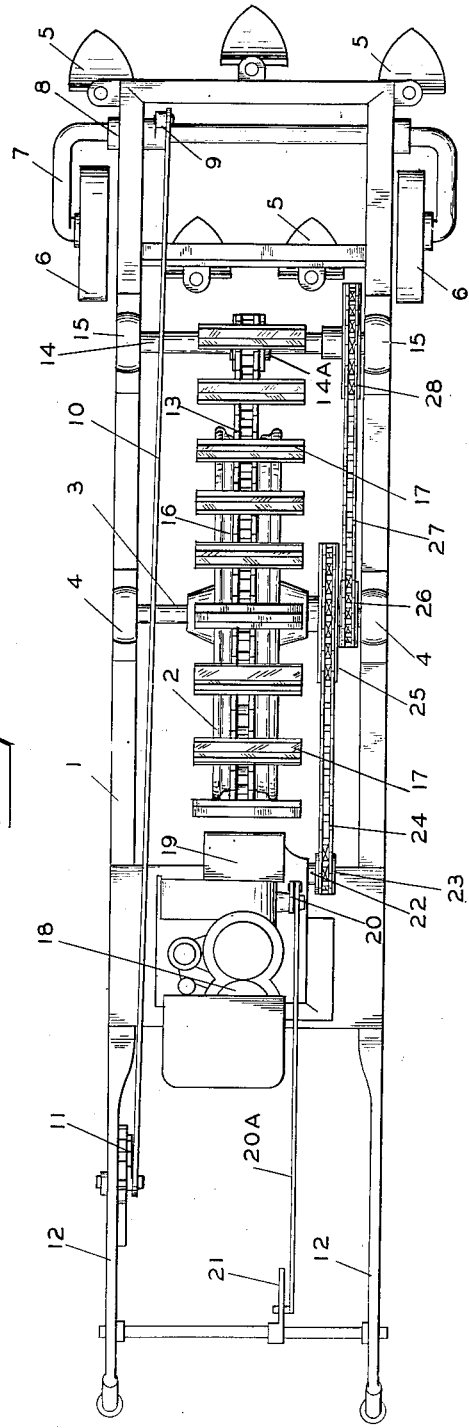
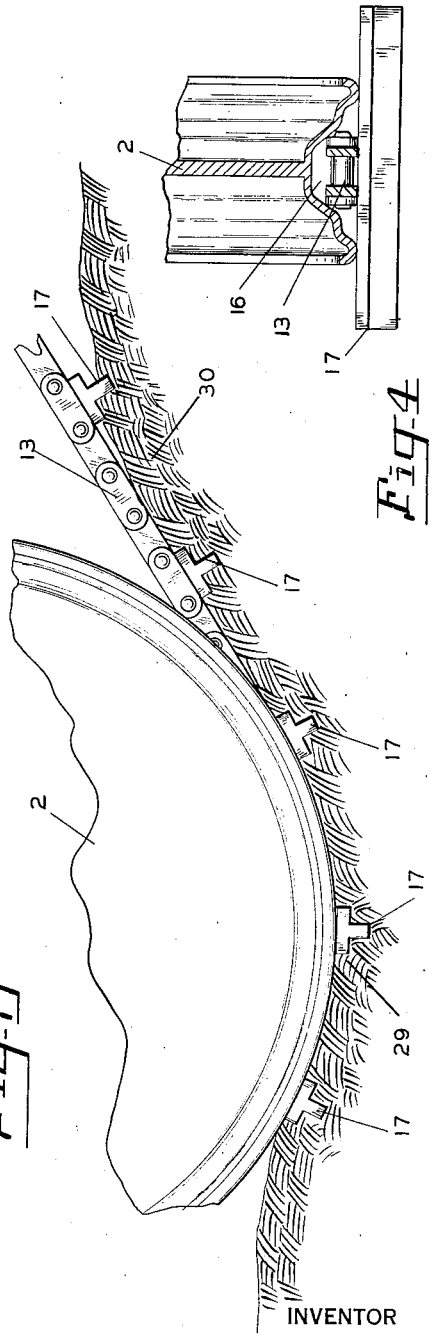
INVENTOR
RALPH W. ATWOOD
BY
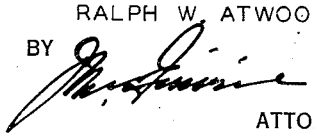
ATTORNEY Patented Mar. 29, 1949

2,465,567

UNITED STATES PATENT OFFICE 2,465,567

GARDEN TRACTOR DRIVE TRANSMISSION MECHANISM

Ralph W. Atwood, Canby, Oreg., assignor to Charles L. Cooper, Aurora, Oreg.

Application October 16, 1945, Serial No. 622,628

1 Claim. (Cl. 180—70)

This invention relates to garden tractors and the like and the primary object of the invention is to mount the tractor frame, cultivating tools and the motor on a single bull-wheel. By mounting all of these units on a single wheel the cultivator can be manipulated up and down the rows to be cultivated by the operator with ease and with sensitive response to his wishes.

A further object of the invention is to drive the bull-wheel with a cleated track or chain, the same being mounted in such a manner as to support the weight of the machine on the bull-wheel, and at the same time providing traction by the driving chain or track when the tractor is running in soft ground, this traction being available without interfering with the maneuverability of the tractor.

These and other incidental objects will be apparent in the drawings, specification and claim.

Referring to the drawings:

Figure 1 is a side view of my new and improved garden tractor.

Figure 2 is a plan view of Figure 1.

Figure 3 is a fragmentary enlarged detail showing the relation of the bull-wheel and the track or chain for driving the same.

Figure 4 is a fragmentary sectional view, taken on line 4—4 of Figure 3.

In the drawings:

My new and improved garden tractor consists of a frame 1 supported upon a single bull-wheel 2 by a shaft 3 and the bearings 4. Mounted to one end of the frame 1 are garden tools 5, which may be any of the well known conventional type attachments. Also mounted to this end of the frame are wheels 6, these wheels are for controlling the depth of the tools 5 working within the soil, they are journalled to the crank arms 7, which are pivotally mounted to the frame at 8, the angle of which arms is controlled by the lever arm 9, control rod 10 and lever 11, which is mounted to the handles 12 of the frame 1.

The bull-wheel 3 is driven by the traction chain 13 from the counter shaft 14, which is journalled in suitable bearings 15 on the frame 1. The traction chain 13 runs in a groove 16 of the bullwheel 3 and has cross cleats 17 affixed thereto for engaging the ground surface.

The counter shaft 14 is driven by the motor 18 from the gear box 19, having a clutch control lever 20 operated by the lever 21 mounted on the handles 12. The shaft 22 extending from the gear box 19 has a sprocket 23 keyed thereto for driving the chain 24, which in turn drives the sprocket wheel 25, rotatably mounted to the shaft 3.

Fixedly secured to the sprocket 25 is a sprocket 26 which drives the chain 27 and sprocket 28, keyed to the counter shaft 14. The sprocket assemblies 25 and 26 provide for a speed reduction between the motor 18 and the shaft 14.

I will now describe the operation of my new and improved garden tractor. One of the primary objects of my invention is to mount the frame 1 to a single bull-wheel distributing the weight approximately equal on either side of the wheel. A slight additional weight being mounted to the garden tool operating end. The object of mounting a tractor in this manner is to provide ease of control of the cultivators 5 along the rows to be cultivated, as the handles 12 may be shifted in any direction laterally or vertically pivoting the wheel assembly on the lower part of the bullwheel at 29.

A further object of my invention is the providing of additional traction over the ground surface without interfering with the operation of the pivot point 29 of the bull-wheel. I accomplish this by the drive or traction chain 13 which drives the bull-wheel 2 and at the same time providing traction.

Referring to Figure 3 it will be noted that the cleats 17 are tending to climb over the ground surface as at 30, pulling the bull-wheel up over the ground at this point, similar to a crawler type tractor but still providing for the pivot point at 29. The feature of using the traction chain 13 and its cleats 17 for traction or contact on the ground surfaces working at an incline tending to pull or raise the wheel 2 out of the soft ground is the highlight of my invention, together with the fact that the whole tractor rests on the pivot point at 29 of the bull-wheel as far as its weight is concerned, as stated above still having the traction chain 13, which is mounted to the bull-wheel at such an angle to the ground surface as to afford additional traction but still not interfering with the pivoting sidewise of the tractor by the handles 12.

I have illustrated a broken line 31 which represents the position of a housing over the mechanism, enclosing the same preventing the dust and dirt from falling on the mechanism thereunder. I have purposely left this covering off for convenience of illustration.

I do not wish to be limited to the exact structure illustrated in the drawings and claimed herein, as other mechanical equivalents may be substituted still carrying out the objects of my invention.

I claim:

In a garden tractor, a frame having parallel side members, aligned bearings mounted on said side members, a shaft journalled in said side members, a bull wheel mounted on said shaft, a power unit mounted on the frame behind the bull wheel and having a relatively small sprocket, a relatively large sprocket revolubly mounted on said shaft, a chain connecting said sprockets, a second relatively small sprocket fixed to the large sprocket to revolve therewith, a second shaft carried by said frame in substantial horizontal alignment with the first shaft, a second relatively large sprocket fixed on the second shaft, a chain connecting the second relatively small and large sprockets, a second sprocket fixed on the second shaft, and a chain trained around the last-mentioned sprocket and the bull wheel.

RALPH W. ATWOOD.

REFERENCES CITED

The following references are of record in the file of this patent:

UNITED STATES PATENTS

| Number | Name | Date |
|---|---|---|
| 1,034,907 | Grant | Aug. 6, 1912 |
| 1,153,570 | Price | Sept. 14, 1915 |
| 1,201,232 | Archer | Oct. 17, 1916 |
| 1,292,045 | Price | Jan. 21, 1919 |
| 1,616,341 | Walling | Feb. 1, 1927 |
| 2,052,068 | Ziegler | Aug. 25, 1936 |

FOREIGN PATENTS

| Number | Country | Date |
|---|---|---|
| 1,177 | Great Britain | 1872 |
| 110,198 | Great Britain | Oct. 15, 1917 |